United States Patent
Dadkhahi et al.

(10) Patent No.: US 11,055,317 B2
(45) Date of Patent: Jul. 6, 2021

(54) METHODS AND SYSTEMS FOR DETERMINING AND OUTPUTTING CORRELATIONS BETWEEN METRICS IN A WEB ANALYTIC DATASET

(71) Applicant: Adobe Inc., San Jose, CA (US)

(72) Inventors: Hamid Dadkhahi, San Francisco, CA (US); Mohammad Ghavamzadeh, San Jose, CA (US); Hung Bui, Sunnyvale, CA (US); Branislav Kveton, San Jose, CA (US)

(73) Assignee: ADOBE INC., San Jose, CA (US)

( * ) Notice: Subject to any disclaimer, the term of this patent is extended or adjusted under 35 U.S.C. 154(b) by 578 days.

(21) Appl. No.: 15/611,563

(22) Filed: Jun. 1, 2017

(65) Prior Publication Data

US 2018/0349466 A1 Dec. 6, 2018

(51) Int. Cl.
| | |
|---|---|
| *G06F 16/28* | (2019.01) |
| *G06N 5/04* | (2006.01) |
| *G06Q 30/02* | (2012.01) |
| *G06N 7/00* | (2006.01) |

(52) U.S. Cl.
CPC ........... *G06F 16/285* (2019.01); *G06N 5/047* (2013.01); *G06Q 30/0201* (2013.01); *G06N 7/00* (2013.01)

(58) Field of Classification Search
None
See application file for complete search history.

(56) References Cited

U.S. PATENT DOCUMENTS

| | | | | |
|---|---|---|---|---|
| 2004/0181554 A1* | 9/2004 | Heckerman | ........ | G06Q 30/0641 |
| 2013/0204831 A1* | 8/2013 | Reshef | ...................... | G06N 5/04 |
| | | | | 706/48 |
| 2014/0046983 A1* | 2/2014 | Galloway | .......... | G06Q 30/0201 |
| | | | | 707/798 |
| 2016/0147585 A1* | 5/2016 | Konig | ..................... | G06F 16/20 |
| | | | | 714/37 |

OTHER PUBLICATIONS

Reshef, D., et al., "Detecting Novel Associations in Large Data Sets", Science, vol. 334, Dec. 16, 2011, 7 pages.

(Continued)

*Primary Examiner* — Giuseppi Giuliani
(74) *Attorney, Agent, or Firm* — Kilpatrick Townsend & Stockton LLP

(57) ABSTRACT

Certain embodiments involve determining and outputting correlations between metrics in large-scale web analytics datasets. For example, a processor identifies pairs of data metrics in a web analytics data set and determines a Maximal Information Coefficient (MIC) score for each pair of data metrics that indicates a strength of a correlation between the pair of data metrics. The processor generates an interactive user interface that graphically displays each pair of correlated data metrics having an MIC score above a threshold and the interactive user interface indicates the strength of the correlation between each displayed pair of correlated data metrics. The processor receives user input indicating an adjustment to the threshold and modifies the interactive user interface in response to receiving the user input by adding pairs of correlated data metrics to, or removing pairs of correlated metrics from, the interactive user interface based on the adjustment to the threshold.

20 Claims, 13 Drawing Sheets

(56) References Cited

OTHER PUBLICATIONS

Reshef, Y., et al., "Measuring Dependence Powerfully and Equitably, " arXiv preprint arXIV:1505.02213, Journal of Machine Learning Research, 17, Jun. 2015 63 pages.
Reshef, D., et al., "An Empirical Study of Leading Measures of Dependence", arXiv preprint arXiv:1505.02214, May 12, 2015, 42 pages.
Mousavi, A., et al., "An Information-Theoretic Measure of Dependency Among Variable sin Large Datasets", Communication, Control, and Computing (Allerton), 2015 53rd Annual Allerton Conference on. IEEE, Sep. 2015, 9 pages.
Chen, Yuan, et al, "A New Algorithm to Optimize Maximal Information Coefficient", PloS one 11.6 : e0157567, Jun. 22, 2016, 9 pages.
Albanese, Davfde, et al, "Minerva and Minepy: A C Engine for the Mine Suite and Its R, Python and Matlab Wrappers" Bioinformatics, vol. 29, No. 3 2013, 2 pages.
Hubert, M., et al., "An Adjusted Boxplot for Skewed Distributions", Comput. Stat. Data Anal., vol. 52, No. 12, Aug. 2008, 8 pages.
Agrawal, Rakesh, et al., "Diversifying Search Results", In Proceedings of the Second ACM International Conference on Web Search and Data Mining, WSDM, Feb. 2009, 10 pages.
Tukey, J. W., "Exploratory Data Analysis", Behavioral Science: Quantitative Methods. AddisonWesley, Reading, Mass., 1977, 20 pages.
Reshef, D., et al., "MINE: Maximal Information-Based Nonparametric Exploration" Available online at: http://www.exploredata.net, 2011, 3 pages.

* cited by examiner

Algorithm 1 Diversified Ranking of Metrics

Inputs: set of metrics $E$, set of pairwise MIC scores $S$, cardinality of the metric subset $k$
Outputs: set of top $k$ metrics $A$
Initialize: $A \leftarrow \{\}$
for $i = 1 \rightarrow k$ do
　　$t \leftarrow \arg\max_{j \in E/a} f(a + \{j\})$
　　$A \leftarrow A \cup \{t\}$
end for
return $A$

FIG. 8

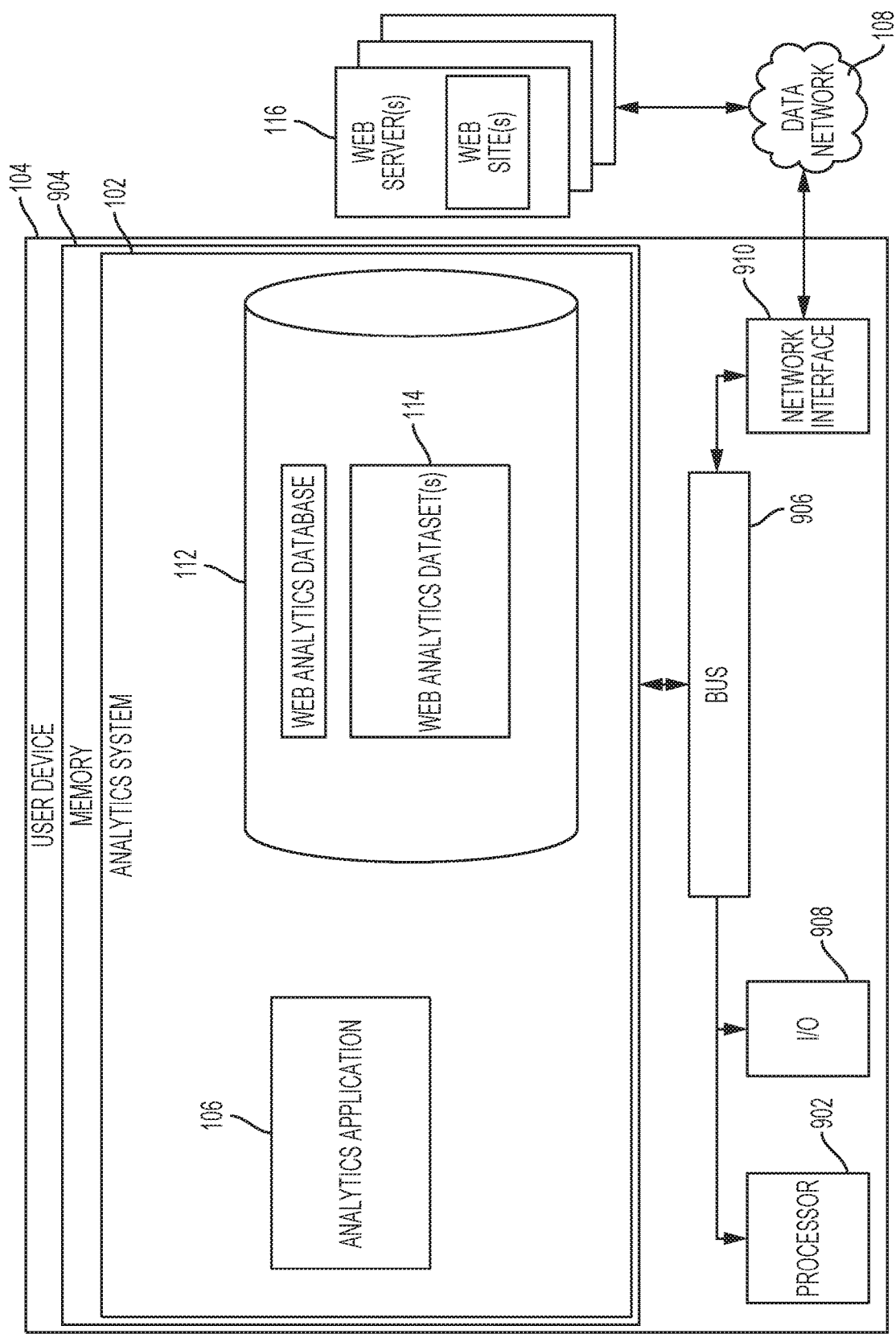

METHODS AND SYSTEMS FOR DETERMINING AND OUTPUTTING CORRELATIONS BETWEEN METRICS IN A WEB ANALYTIC DATASET

TECHNICAL FIELD

This disclosure generally relates to web analytics technology for analyzing large-scale collections of web analytics data.

BACKGROUND

Web analytics technology provides tools for collecting and analyzing data collected about user behaviors and interactions with one or more webpages or websites. Web analytics tools provide functionality for analyzing and reporting on such data in ways designed to assist analysts in understanding how and why certain data metrics are correlated to assist website operators in determining how to more effectively present content or user interfaces on its various webpages, market its goods or services, drive user interest in, or sales via, its website, etc.

In the case of large-scale website analytics datasets, such as marketing datasets that include a large number of data metrics, it can be extremely important to automatically show an analyst how these metrics are correlated with each other. Understanding correlations between data metrics can be useful for removing redundancy in the data that needs to be reviewed or acted upon. For example, an analyst may not need to see separate reports for each of two heavily correlated metrics, as such reports will likely show redundant conclusions. Likewise, an analyst can use each of two heavily correlated metrics in any further analysis (e.g., both metrics may not need to be input into a machine learning algorithm). Similarly, understanding that no correlation exists between or among certain metrics may allow an analyst to avoid trying to use deviations over one such metric to predict deviations over another one.

SUMMARY

Various embodiments of the present disclosure provide improved systems and methods for determining correlations between data metrics in large-scale web analytics data sets, such as marketing datasets, and generating user interfaces for allowing analysts to understand and analyze such correlations.

In one example, a method for determining correlations between data metrics and generating user interfaces indicating the data metrics and correlations includes identifying, by a processor, each pair of data metrics in a web analytics data set. The method further includes determining, by the processor, a Maximal Information Coefficient (MIC) score for each pair of data metrics. The MIC score for each pair of data metrics indicates a strength of a correlation between the pair of data metrics. The method further includes generating, by the processor, an interactive user interface graphically displaying each pair of correlated data metrics having an MIC score above a threshold. The interactive user interface indicates the strength of the correlation between each displayed pair of correlated data metrics. The method further includes receiving, by the processor, user input indicating an adjustment to the threshold. The method also includes modifying, by the processor, the interactive user interface in response to receiving the user input by adding pairs of correlated data metrics to the interactive user interface or removing pairs of correlated data metrics from the user interface based on the adjustment to the threshold.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

FIG. 8 is an example of an image of a greedy algorithm that can be used by the analytics system to determine an optimal set of diversified top-k data metrics in accordance with one or more embodiments.

FIG. 9 is a block diagram of an exemplary user device that executes an analytics system to determine correlations between data metrics in large-scale web analytics data sets and generate user interfaces for allowing analysts to understand and analyze such correlations in accordance with one or more embodiments.

DETAILED DESCRIPTION

Overview

Figure 1:
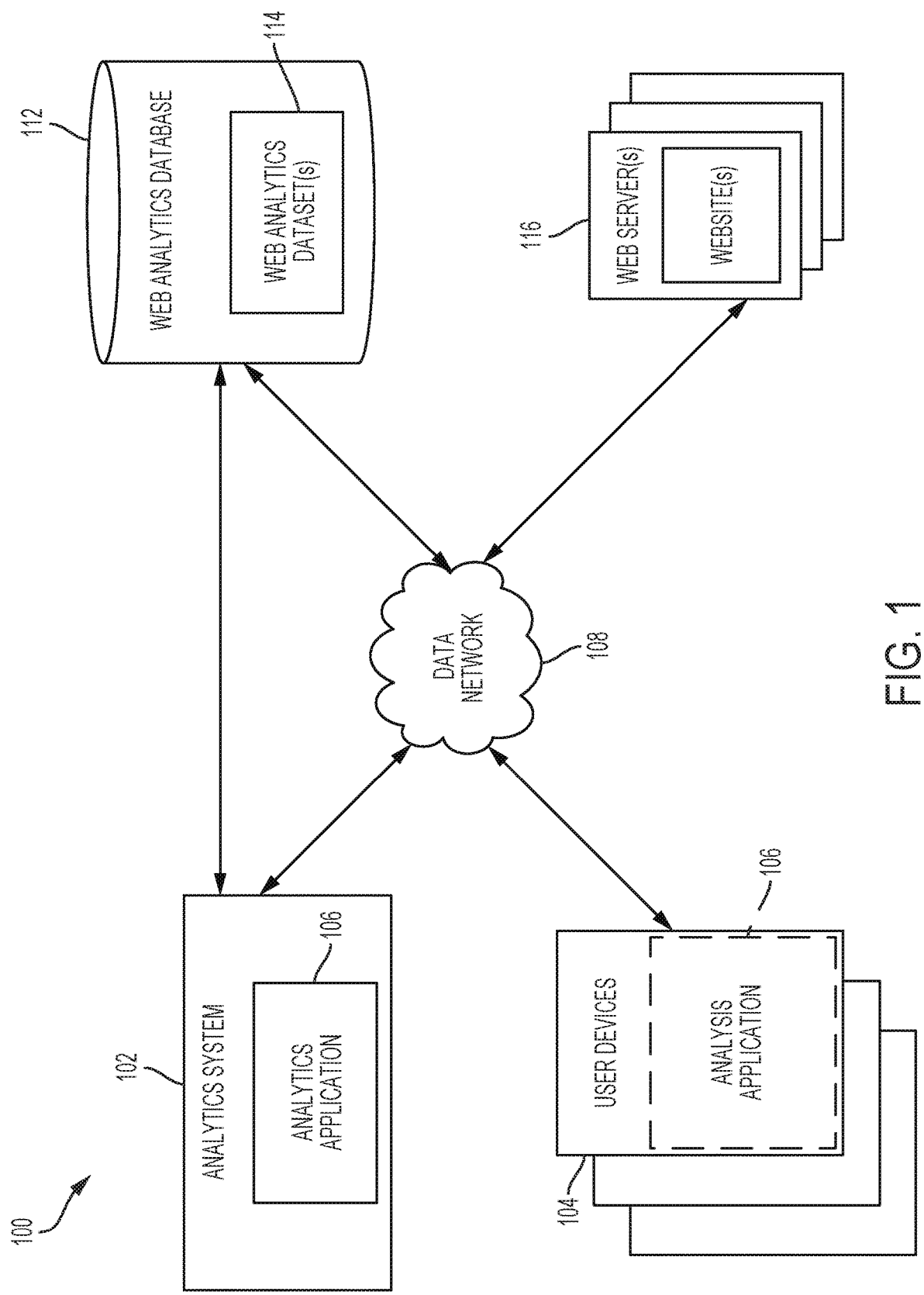
FIG. 1 is a block diagram of an exemplary environment in which an analytics system determines correlations between data metrics in large-scale web analytics data sets and generates user interfaces for allowing analysts to understand and analyze such correlations in accordance with one or more embodiments.

Various embodiments of the present disclosure involve determining correlations between data metrics in large-scale web analytics datasets, such as marketing datasets. Such datasets typically include a large number of metrics, which can make it difficult for human observers and prior analytics tools to accurately determine correlations among and between metrics. For example, many prior analytics tools rely on the Pearson correlation measure to identify correlations between metrics. However, the Pearson correlation measure captures only linear relationships between metrics, which can inaccurately indicate the existence or lack of a relationship between some metrics and is therefore not able to effectively account for outliers or anomalies in the data.

Certain embodiments of the present disclosure address these issues by employing algorithms for determining both linear, non-linear, and even functional correlations between metrics in a large-scale web analytics dataset. In particular, systems and methods disclosed herein employ algorithms for determining (or approximating) a Maximal Information Coefficient (MIC) between each pair of metrics in a dataset. MIC is a measure of dependence between a pair of metrics. As noted, MIC is able to capture a wide range of correlations (also referred to as relationships) from linear to nonlinear and even nonfunctional relationships and is robust to outliers in the dataset. From MIC computations, a larger class of statistics, referred to as maximal information-based nonparametric exploration (MINE), can be derived and can be employed to obtain additional information about the relationship between a pair of metrics, e.g., linearity, functionality, complexity, and monotonicity of the relationship.

The systems and methods disclosed herein also provide novel interactive user interfaces for graphically displaying each pair of correlated metrics having an MIC score greater than a user-determined threshold and indicating the relative correlation strength for each such pair of metrics. For example, the user interface may present a graph showing nodes corresponding to correlated metrics, with lines (or edges) drawn between each correlated pair of nodes to indicate the correlation. An interactive control element may be provided for allowing an analyst to adjust the threshold, such that edges between pairs of nodes having correlation strengths less than the threshold are not shown in the user interface. In response to an adjustment of the threshold, pairs of correlated metrics or edges between pairs of correlated metrics are added to or removed from the graphical display accordingly. In addition, varying thicknesses and/or colors can be applied to the edges to indicate the relative correlation strength of each pair of nodes.

In other aspects of the invention, MIC scores are determined for pairs of metrics in the dataset for each time segment in a set of time segments. Time segments may correspond to days, weeks, months, years or other measures of time. A mean MIC score and an MIC variance are determined over the set of time segments. Then, other algorithm(s), e.g., Tukey's algorithm, is/are applied to the MIC scores to identify outliers (also referred to as anomalies) and extreme outliers in the correlations over the set of time segments. For example an MIC score may indicate a strong correlation between two metrics during only one day of year. This outlier may be of interest to an analyst who might wish to avoid or replicate that anomaly in the future. Again, interactive user interfaces can be provided for allowing the analyst to visualize correlations and outliers in the data. A graph format similar to that described above may be presented, along with an interactive control element for adjusting upper and lower MIC score thresholds. Only those pairs of metrics having mean MIC scores falling between the upper and lower thresholds are shown in the graph. In other aspects of the invention, only those pairs of metrics having mean MIC scores below the lower threshold and above the upper threshold are shown in the graph. When an edge between a pair of correlated metrics is selected by the analyst, additional information may be displayed, such as the mean MIC score, the MIC score variance, MIC score outliers, and MIC score extreme outliers.

In an additional aspect of the invention, pairwise MIC scores may be used to determine a diversified top-k list of metrics in the dataset. This process may be useful for reducing the amount or type of data to be reviewed by an analyst. In one example, the algorithms disclosed herein for determining a diversified top-k list of metrics may be applied to outlier MIC scores to determine the metrics that most contribute to the anomalies.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Certain Definitions

As used herein, the term "metric" or "data metric" is used to refer to a single type of data. In the context of web analytics data, metrics are types of data that indicate information such as user behaviors and interactions with a webpage or web site, performance and content of a webpage or website, and the like. Some specific examples of web analytics data metrics include, but are not limited to, clicks, revenue, page views, completed sales, incomplete sales, and physical location and/or identification of users. Many other types of web analytics data metrics will occur to those of skill in the art and are within the scope of the present invention.

As used herein, the term "correlation" (or "relationship") refers to a direct or indirect relationship between two metrics in a dataset. For example, in the context of web analytics data, the metric "completed purchases" will have a direct impact on and thus a direct correlation with the metric "revenue."

As used herein, the term "outlier" (or "anomaly") refers to an abnormal occurrence or manifestation in the data. Thus, a particular data point with a value of 100 where every other data point normalizes below a value of 10, would be considered an outlier.

Detection of Pairwise Metric Correlations

FIG. 1 is a block diagram of an exemplary environment 100 in which an analytics system 102 determines correlations between data metrics in large-scale web analytics data sets and generates user interfaces for allowing analysts to understand and analyze such correlations in accordance with one or more embodiments. The environment 100 includes the analytics system 102, one or more user devices 104, a web analytics database 112, and a web server 116 that provides one or more websites. The analytics system 102, user devices 104, web analytics database 112, and web server 116 are communicatively coupled via one or more data networks 108 (e.g., the Internet, one or more local area networks ("LAN"), one or more wired area networks, or some combination thereof).

In some embodiments, the user of the user device 104 visits a webpage or an application store to explore applications supported by the analytics system 102. The analytics system 102 provides the applications as a software as a service ("SaaS"), or as a standalone application that can be installed on one or more of the user devices 104, or as a combination.

In the example depicted in FIG. 1, the analytics system 102 can be any user device via which a user (e.g., an analyst) can analyze determined correlations between data metrics in large-scale web analytics data sets. In another example, the analytics system 102 is implemented on one or more servers and the user interfaces with the one or more user devices 104 to access the analytics system 102 via the data network 108.

In some embodiments, each of the user devices 104 represents various types of client devices. For example, the user device 104 is a mobile device (e.g., a mobile telephone, a smartphone, a PDA, a tablet, a laptop, a camera, a tracker, a watch, a wearable device, etc.). The user device 104, however, in some embodiments, is a non-mobile device (e.g., a desktop computer or another type of client device). In some embodiments, the analytics system 102 is executed on the one or more user devices 104 via an analytics application 106. In this example, the user devices 104 include one or more of the components of the analytics system 102.

The web analytics database 112 stores one or more web analytics datasets 114, which can include various data metrics. An example of a data metric includes, but is not limited to, a number of items sold via a webpage, an amount of revenue generated from a webpage, a number of orders placed via a webpage, an average amount of time a user spends on a webpage, a total amount of time a user spends on a webpage, an amount of virtual carts on the webpage, an amount of times a user views a virtual cart on the webpage, an amount of times a user adds an item to a virtual cart on a webpage, an amount of times a user removes or deletes an item from a virtual cart on a webpage, an amount of times a user removes or deletes a virtual cart, an amount of times a user proceeds to check out on the webpage, an amount of times a webpage is viewed by a user, an amount of times a webpage is visited by a user, a number of visitors of the webpage, a number of webpages viewed by a user per visit to a website, etc.

In some embodiments, the analytics system 102 is communicatively coupled to the web analytics database 112 and the analytics system 102 receives or obtains data from the web analytics database 112 via the data network 108 or a direct connection. In another embodiment, the analytics system 102 includes the web analytics database 112 and can access the web analytics database 112.

In some embodiments, the analytics system 102 includes an analytics application 106, which can include one or more instructions stored on a computer-readable storage medium and executable by processors of one or more computing devices. When executed by the one or more processors, the computer-executable instructions of the analytics application 106 cause the analytics system 102 to identify pairs of data metrics in the web analytics dataset 114 or pair each data metric in the web analytics dataset 114 with each other data metric in the web analytics dataset 114 to form various pair of data metrics. The analytics application 106 can then cause the analytics system 102 to determine a correlation or relationship between the data metrics of each pair of data metrics. For example, the analytics system 102 determines both linear, non-linear, and even functional correlations between each pair of data metrics in the web analytics dataset 114. In some embodiments, the analytics system 102 also determines a correlation score for each pair of data metrics that indicates a strength of the correlation or relationship between the pair of data metrics. For instance, the analytics system 102 uses various algorithms to determine (or approximate) a Maximal Information Coefficient (MIC) score between each pair of data metrics. The MIC score is a measure of dependence between a pair of data metrics that can indicate a relative strength of a correlation or relationship (if any) between the pair of data metrics. In some embodiments, a MIC score or value for a pair of data metrics is between zero and one. In this example, a pair of data metrics having a MIC value of zero indicates a weak dependence of the first data metric of the pair on the second data metric of the pair (e.g., indicates a weak correlation or relationship between the first and second data metric). A pair of data metrics having a MIC value of one indicates a strong dependence of the first data metric of the pair on the second data metric of the pair (e.g., indicates a strong correlation or relationship between the first and second data metric).

In some embodiments, the web analytics database 112 obtains or receives data metrics over a period of time and stores the data metrics in the web analytics dataset 114. Thus, in some embodiments, the analytics system 102 iteratively identifies pairs of data metrics in the web analytics dataset 114 or iteratively pairs each data metric in the web analytics dataset 114 with each other data metric in the web analytics dataset 114 and then iteratively determines a correlation or relationship between the metrics of each pair of data metrics.

In some examples, the computer-executable instructions of the analytics application 106 cause the analytics system 102 to generate one or more interactive user interfaces for graphically displaying each pair of correlated data metrics having a correlation score greater than a threshold value (e.g., each pair of correlated data metrics having an MIC score greater than a threshold MIC value). In some instances, the threshold value can be a user determined or user-adjustable threshold value, which the user can provide to the analytics system 102 or adjust via user input. The interactive user interfaces generated by the analytics system 102 may also indicate a relative strength of the correlation between each pair of metrics. For example, analytics system 102 generates an interactive user interface that includes a graph showing one or more nodes that correspond to data metrics. The graph can also include an edge or line between each correlated pair of nodes, which can indicate to a user (e.g., an analyst) the correlation between the pair of nodes. In some embodiments, a size or thickness of the edge or line between each correlated pair of nodes corresponds to the strength of the correlation. As an example, a thick edge between a pair of nodes indicates a strong correlation between the pair of nodes and a thin edge between another pair of nodes indicates a weak relationship between the other pair of nodes. In some embodiments, various other characteristics of an edge between each correlated pair of nodes can indicate the strength of the correlation including, for example, a color or shade of the edge between the metrics. The interactive user interfaces can include an interactive control element (e.g., a virtual button, slider, or any other interactive element) via which a user can provide user input to adjust the threshold value, which can cause the analytics system 102 to adjust the user interfaces or generate one or more additional user interfaces. For example, the analytics system 102 removes, from the user interface, nodes having a correlation score below the threshold value or removes edges between nodes having a correlation score below the threshold value. As another example, the analytics system 102 adds, to the user interface, pairs of nodes having a correlation score above the threshold value.

In another embodiment, the computer-executable instructions of the analytics application 106 cause the analytics system 102 to determine or identify an outlier or anomalous correlation between a pair of data metrics. For example, the analytics system 102 determines MIC scores for pairs of data metrics in the web analytics datasets 114 for each time segment over a period of time. Time segments may correspond to days, weeks, months, years or other measures of time within the period of time. In this embodiment, the analytics system 102 can determine mean or average MIC score for pairs of data metrics over the period of time. The analytics system 102 can then compare the MIC scores for a pair of data metrics for each time segment to the average MIC score of the pair of data metrics over the period of time and identify an outlier or anomalous correlation between the pair of data metrics based on the comparison. As an example, the analytics system 102 compares the MIC score for the pair of data metrics for each time segment to the average MIC score and determines an MIC variance or deviation of each time segment from the average MIC score. The analytics system 102 then identifies as an outlier or an anomaly an MIC score for a time segment that has an MIC variance above a variance threshold. In some embodiments, the analytics system 102 applies various algorithms such as, for example, Tukey's algorithm, to the MIC scores for the pair of data metrics for each time segment to identify outliers and extreme outliers in the correlations over the period of time. For example, an MIC score may indicate a strong correlation between a pair of data metrics during only one month over a period of one year and the analytics system 102 can identify this outlier correlation between the pair of data metrics. In this embodiment, the computer-executable instructions of the analytics application 106 can cause the analytics system 102 to generate one or more interactive user interfaces for graphically displaying pairs of correlated data metrics in substantially the same manner as described above. In this embodiment, the analytics system 102 may only display pairs of correlated data metrics associated with an outlier or anomaly. The user can provide user input via the interactive control element to adjust lower MIC score threshold values and upper MIC score threshold values. The analytics system 102 then displays, via the user interface, pairs of data metrics having mean MIC scores between the upper and lower correlation score threshold values. In another embodiment, the analytics system 102 displays, via the user interface, pairs of data metrics having mean MIC scores below the lower MIC score threshold value and above the upper MIC score threshold value. In some embodiments, the user provides user input indicating a selection of an edge between a pair of correlated data metrics and the analytics system 102 displays, via the user interfaces, additional data about the pair of correlated data metrics including, for example, the mean MIC score, an MIC score variance, an MIC score outlier, or an MIC score extreme outlier.

In another embodiment, the computer-executable instructions of the analytics application 106 cause the analytics system 102 to determine a diversified top-k list of data metrics in the web analytics datasets 114 that is representative of the various data metrics. Identifying the diversified top-k list of data metrics to reduce an amount or type of data to be reviewed by the user or analyst. In one example, the analytics system 102 applies one or more algorithms to outlier or anomaly MIC scores to determine the diversified top-k list of data metrics that contribute the most to the outliers or anomalies.

In this manner, the analytics system 102 determines both linear, non-linear, and even functional correlations between data metrics in a large-scale web analytics dataset (e.g., the web analytics datasets 114), accounts for outlier or anomalous correlations between pairs of data metrics, and generates user interfaces for allowing analysts to understand and analyze such correlations.

Although the exemplary environment 100 of FIG. 1 is depicted as having a certain number of components, in other embodiments, the exemplary environment 100 has any number of additional or alternative components. Further, while FIG. 1 illustrates a particular arrangement of the analytics system 102, user devices 104, web analytics database 112, and the data network 108, various additional arrangements are possible. As an example, while FIG. 1 illustrates web analytics database 112 and the analytics system 102 as part of separate systems, in some embodiments, the web analytics database 112 and the analytics system 102 are part of a single system and the web analytics database 112 is stored in a memory or storage of the analytics system 102.

Figure 2A:
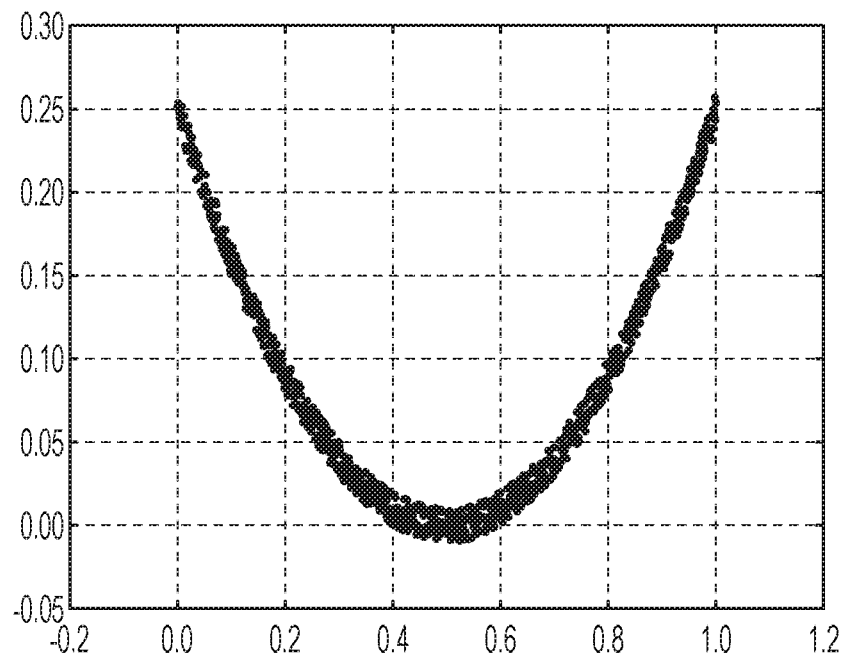
FIG. 2A shows a pair of metrics having a noisy quadratic relationship.
Figure 2B:
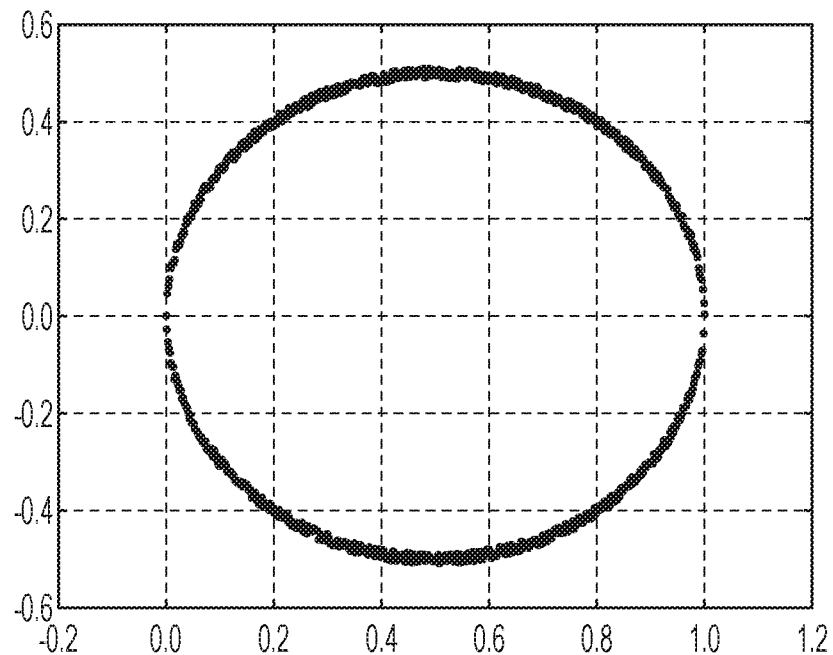
FIG. 2B shows a pair of metrics having a noisy circular relationship, which is nonfunctional.

A significant advantage of using MIC to identify correlations between pairs of metrics in a web analytics dataset is its ability to capture a wide range of pairwise correlations from nonlinear to even nonfunctional relationships. FIG. 2A shows a pair of metrics having a noisy quadratic relationship. MIC is able to capture this nonlinear relationship and assigns it a high score of 0.95. In contrast, the Pearson correlation measure, which is only able to capture linear relationships, assigns a negligible correlation score of 0.0002 to this pair of metrics. As another example, FIG. 2B shows a pair of metrics having a noisy circular relationship, which is nonfunctional. MIC again assigns a high score of 0.85 to this relationship, whereas the Pearson score is 0.0001.

Figure 3A:
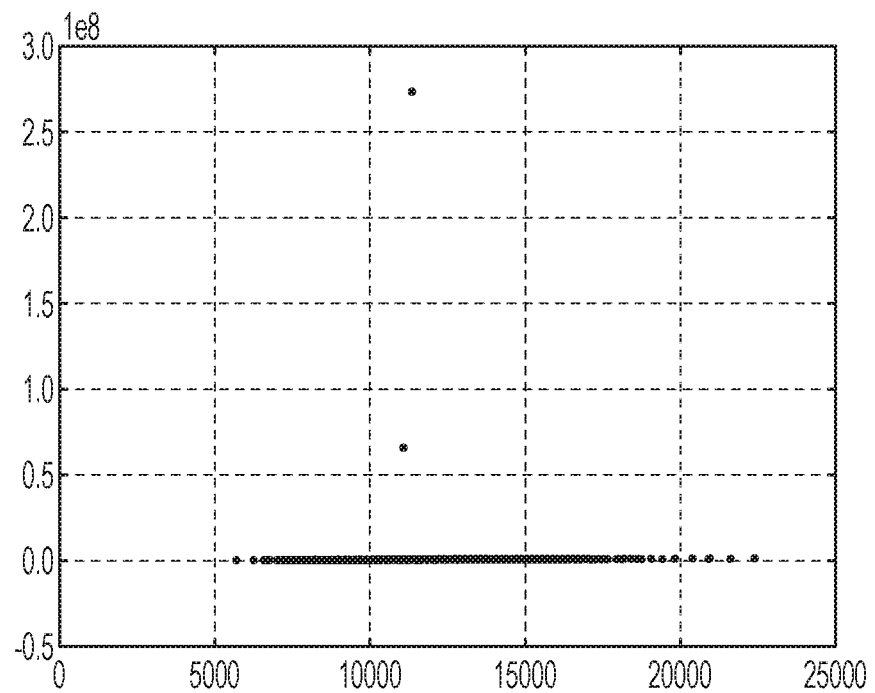
FIG. 3A shows a scatter plot of the relationship between two data metrics.
Figure 3B:
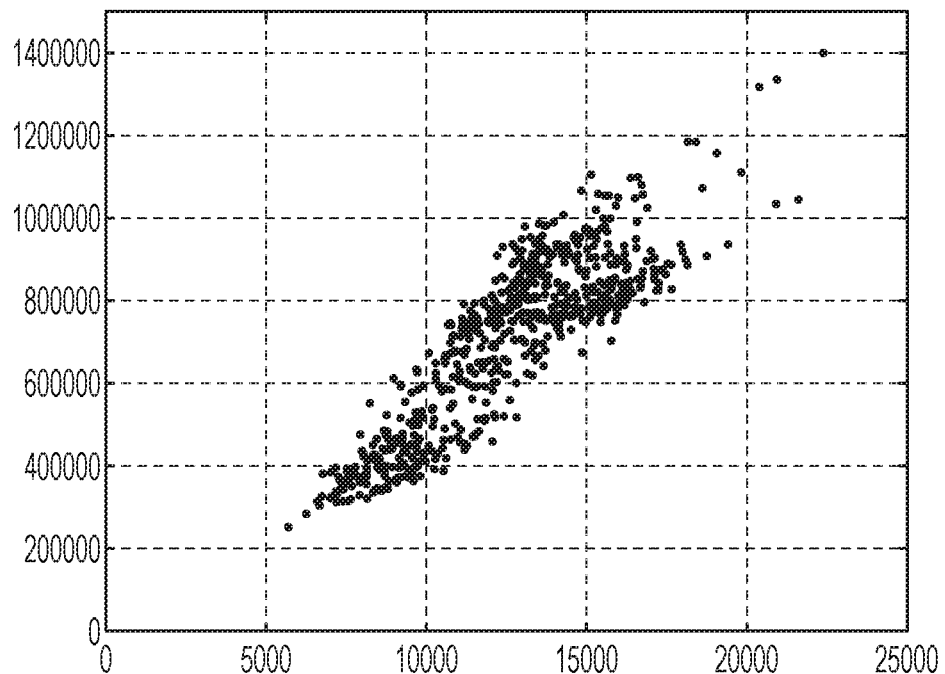
FIG. 3B is a zoomed in view of the plot of FIG. 3A.

Another important advantage of MIC is its robustness to outliers, which are commonly present in web analytics data sets, such as marketing datasets. By way of example, FIG. 3A shows a scatter plot of the relationship between two data metrics, such as units sold and revenue. In this figure, the scale of the y-axis is $10^8$. As shown, two outliers are present in the data and are completely isolated from the remainder of the data points. FIG. 3B shows another view of the same plot, zoomed into the cluster of data points. In this figure, it can be seem that a noisy linear relationship exists between the pair of variables. MIC is able to detect this relationship by assigning a moderately large MIC score of 0.72, whereas the Pearson correlation measure completely misses this relationship and assigns a negligible Pearson score of 0.0052. In general, if the outliers in the dataset are off the regression line, the Pearson score tends to decrease drastically.

Figure 3C:
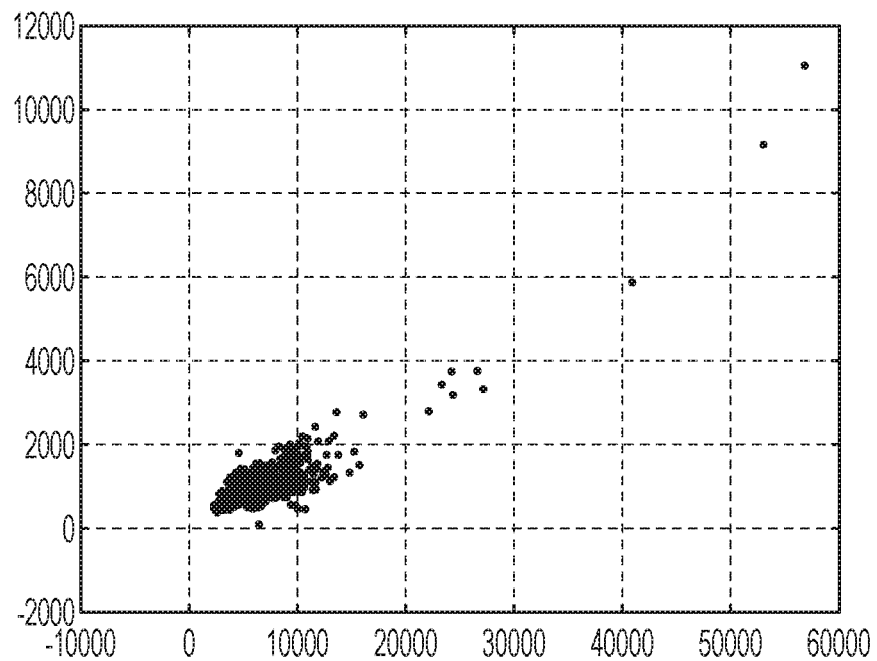
FIG. 3C is a plot of the relationship between two data metrics.
Figure 3D:
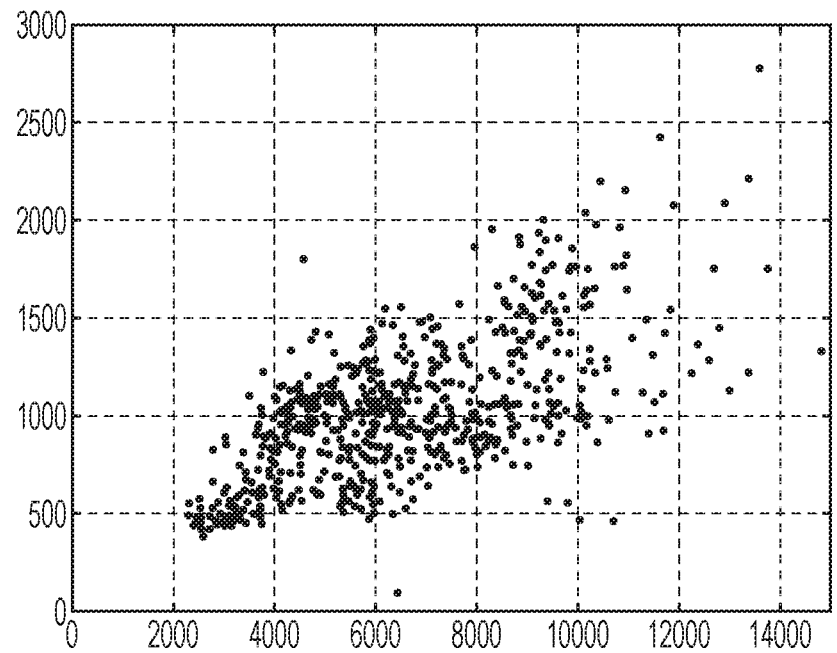
FIG. 3D is a zoomed in view of the plot of FIG. 3C.

A second example of MIC's robustness to outliers is shown in FIGS. 3C and 3D. FIG. 3C is a plot of the relationship between two data metrics, such as orders and cart views. As shown, there are multiple outliers present in the data. FIG. 3D shows another view of this plot, zoomed into the cluster of data points. Here it can be seen that the data points are distributed almost randomly and thus there is no clear relationships between the two metrics. However, the Pearson correlation measure incorrectly identifies a strong linear relationship and assigns a high Pearson score of 0.87. On the other hand, MIC properly detects the non-existence of a clear relationship between the metrics and assigns a low MIC score of 0.35. In general, if outliers in the dataset are along the regression line, Pearson score tends to increase substantially.

Figure 4:
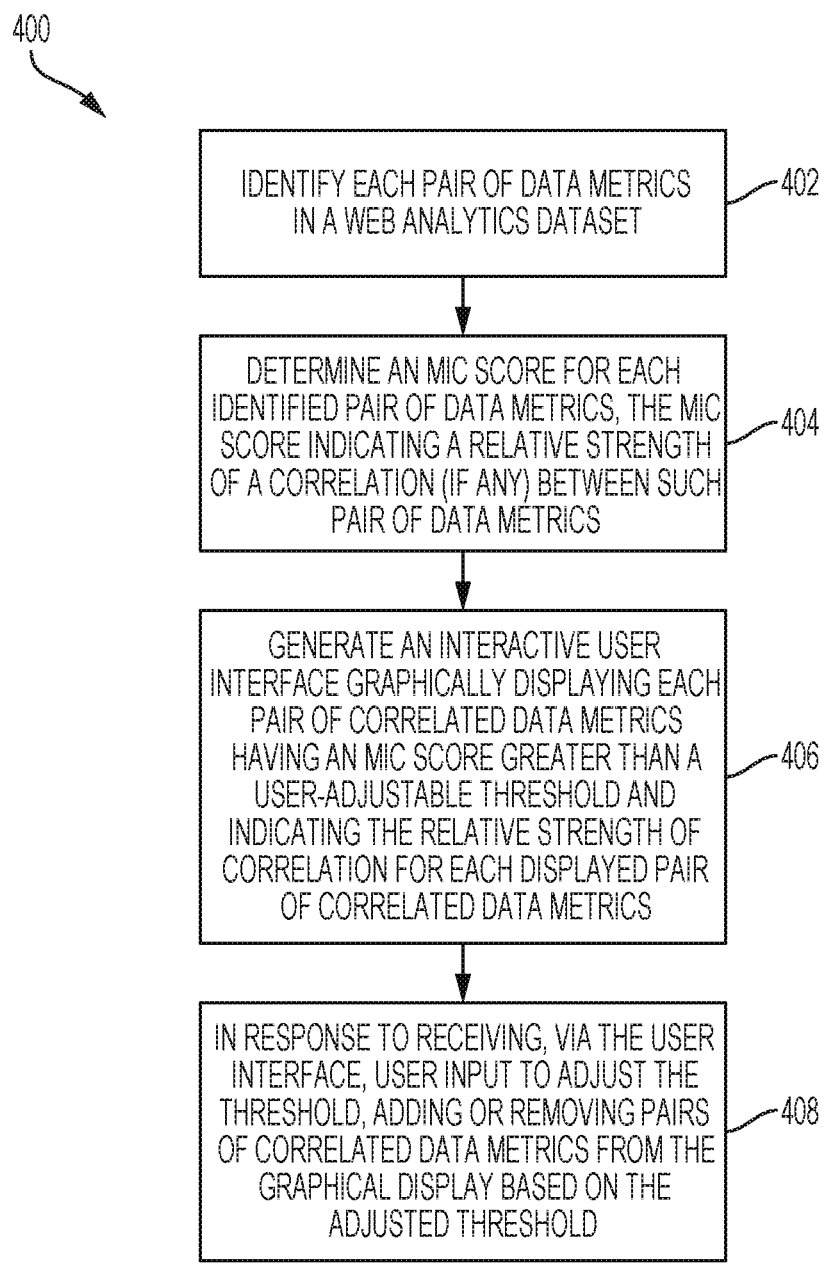
FIG. 4 is a flow chart depicting an example of a process for determining correlations between data metrics in large-scale web analytics data sets and generating user interfaces for allowing analysts to understand and analyze such correlations in accordance with one or more embodiments.

FIG. 4 is a flow chart depicting an example of a process 400 for determining correlations between data metrics in large-scale web analytics data sets and generating user interfaces for allowing analysts to understand and analyze such correlations. In some embodiments, one or more processing devices such as, for example, the computing system described herein with respect to FIG. 8, implement operations depicted in FIG. 4 by executing suitable program code (e.g., the analytics system 102 of FIG. 1) that implements one or more algorithms encompassed by the process 400. For illustrative purposes, the process 400 is described with reference to the examples depicted in FIG. 1, but other implementations are possible.

In block 402, each pair of data metrics in a web analytics dataset 114 is identified. In some embodiments, the analytics system 102 is communicatively coupled to a web analytics database 112 that stores the web analytics dataset 114, which includes various data metrics. The analytics system 102 receives or obtains the data metrics from the web analytics database 112 via the data network 108 or a direct connection. In another embodiment, the analytics system 102 includes the web analytics database 112 and can access the data metrics in the web analytics dataset 114.

The analytics system 102 can include an analytics application 106, which can cause the analytics system 102 to identify pairs of data metrics in the web analytics dataset 114. In another embodiment, the analytics application 106 causes the analytics system to pair each data metric in the web analytics dataset 114 with each other data metric in the web analytics dataset 114 to form various pair of data metrics and then identifies the various pairs of data metrics. As an example, the analytics system 102 identifies a pair of data metrics such as an amount of revenue generated from a webpage and a number of orders placed via the webpage.

In some embodiments, the web analytics database 112 obtains or receives data metrics over a period of time and stores the data metrics in the web analytics datasets 114. Thus, in some embodiments, the analytics system 102 iteratively identifies each pairs of data metrics in the web analytics data set or iteratively pairs each data metric in the web analytics dataset 114 with each other data metric in the web analytics dataset 114.

In block 404, an MIC score for each identified pair of data metrics is determined. In some embodiments, the analytics application 106 causes the analytics system 102 to determine an MIC score for each identified pair of data metrics. The MIC score of each pair of data metrics indicates the strength or relative strength of a correlation or relationship (if any) between the data metrics. The MIC score for each pair of data metrics is between zero and one and a pair of data metrics having an MIC score of zero can indicate a weak dependence of the first data metric of the pair on the second data metric of the pair (e.g., indicates a weak correlation or relationship between the first and second data metric). Conversely, a pair of data metrics having an MIC score of one this can indicate a strong dependence of the first data metric of the pair on the second data metric of the pair (e.g., indicates a strong correlation or relationship between the first and second data metric).

In some embodiments, the analytics system 102 uses one or more algorithms to determine the MIC score for each pair of data metrics. Because an exact calculation of an MIC score of a pair of data metrics can be difficult and computationally expensive, various algorithms have been proposed for determining a close approximation of MIC score. An example of an algorithm that can be used by the analytics system 102 to determine an approximate MIC score for a pair of data metrics is referred to as the "MIC-Approx algorithm" and is described in D. Reshef et al., "Detecting Novel Associations in Large Data Sets," Volume 334 SCIENCE, 1518-1524 (Dec. 16, 2011), available at http://www.uvm.edu/~cdanfort/csc-reading-group/reshef-correlation-science-2011.pdf, which is incorporated by reference herein. Another example of such an algorithm is referred to as the "MIC-e algorithm" and is described in Y. Reshef et al., "Measuring Dependence Powerfully and Equitably," arXiv preprint arXiv:1505.02213 (2015), available at https://arxiv.org/pdf/1505.02213.pdf, which is incorporated by reference herein. For ease of reference, the term "MIC score" is used herein to mean either an exact MIC score or an approximate MIC score.

In some embodiments, the analytics system 102 determines the MIC score for each pair of data metrics using a selected one of the MIC-Approx algorithm and the MIC-e algorithm, depending on the size of the dataset 114. For example, in some such embodiments the MIC-Approx algorithm is used if the web analytics dataset 114 is small (e.g., includes less than 1000 data metrics or samples) and the MIC-e algorithm is used instead if the web analytics dataset 114 is large (e.g., includes more than 1000 data metrics). The choice between using the MIC-Approx algorithm and using the MIC-e algorithm is made to balance trade-offs between the two: the MIC-Approx algorithm is more accurate, but computationally more expensive and slower, while the MIC-e algorithm is less accurate and computationally less expensive and faster.

In particular, the running time of the MIC-Approx algorithm is $O(n^{2.4})$ where O represents complexity, which can represent an asymptomatic behavior of a function (e.g., how fast or slow the function grows or declines) or a limiting behavior of the function and n represents a number of samples. In comparison, the running time of the MIC-e algorithm is $O(n^{1.5})$.

Table 1, below, compares the running times of each of the algorithms for various pairs of data metrics in different data sets A-F.

| Dataset | # samples (n) | # metrics (d) | # metric pairs | Run time MIC-Approx | Run time MIC_e |
|---|---|---|---|---|---|
| A | 639 | 19 | 171 | <30 seconds | <5 seconds |
| B | 639 | 20 | 190 | <30 seconds | <5 seconds |
| C | 639 | 17 | 136 | <30 seconds | <5 seconds |
| D | 15336 | 19 | 171 | 4:00 hours:minutes | <5 minutes |
| E | 15336 | 20 | 190 | 4:30 hours:minutes | <5 minutes |
| F | 15336 | 17 | 136 | 3:15 hours:minutes | <5 minutes |

In other embodiments, the analytics system 102 can determine whether to use the MIC-Approx algorithm or the MIC-e algorithm to determine MIC scores based on any number of factors including, for example, a number of samples in a dataset, a desired rate or speed for determining MIC scores, a desired accuracy of the MIC scores, a desired computational efficiency, and/or any other factor. In some embodiments, the analytics system 102 determines MIC scores for pairs of data metrics using any suitable programming language, method or technique. For example, the analytics system 102 determines MIC scores for pairs of data metrics using one or more packages including, for example, Python or Java.

As described, determining the MIC score for each pair of data metrics can allow the analytics system 102 to determine a correlation or relationship between the data metrics of each pair of data metrics. For example, the analytics system 102 can use the MIC score for each pair of data metrics to derive and use a larger class of statistics, referred to as maximal information-based nonparametric exploration (MINE), to obtain additional information about the relationship between pairs of data metrics, e.g., linearity, functionality, complexity, and monotonicity of the relationship. In contrast, as also described above, using a Pearson correlation measure captures only linear relationships between metrics, which can inaccurately indicate the existence or lack of a relationship between some metrics and is therefore not able to effectively account for outliers or anomalies in the data.

In some embodiments, the analytics system 102 determines MIC scores for pairs of data metrics as described above and stores the MIC scores in a memory or database. For example, the analytics system 102 stores the MIC scores in a comma-separated values (CSV) file and writes the data in JavaScript Object Notation format, which can allow the analytics system 102 to generate one or more interactive user interfaces for graphically displaying the determined MIC scores (e.g., in block 406).

As discussed above, in some embodiments, the analytics system 102 iteratively identifies pairs of data metrics in the web analytics data set or iteratively pairs each data metric in the web analytics dataset 114 with each other data metric in the web analytics dataset 114. Thus, in some embodiments, the analytics system 102 iteratively determines an MIC score for each identified pair of data metrics or iteratively determines both linear, non-linear, and even functional correlations between each pair of data metrics in the web analytics dataset 114 using the MIC score of each pair of data metrics.

In some embodiments, the analytics system 102 can determine a diversified top-k list of data metrics in the web analytics datasets 114 that is representative of the various data metric based on the determined MIC scores for the pairs of data metrics. For example, the analytics system 102 can determine the diversified top-k list and an optimal set of diversified top-k data metrics as described in more detail below with regard to FIG. 6. Identifying the diversified top-k list of data metrics to reduce an amount or type of data to be reviewed by the user or analyst. In one example, the analytics system 102 applies one or more algorithms to outlier or anomaly MIC scores to determine the diversified top-k list of data metrics that contribute the most to the outliers or anomalies.

In block 406, an interactive user interface is generated. In some embodiments, the analytics application 106 causes the analytics system 102 to generate the interactive user interface. In some embodiments, the analytics system 102 generates the interactive user interface to graphically display each pair of correlated data metrics having an MIC score greater than a threshold MIC value. In some instances, the threshold MIC value can be a user determined or user adjustable threshold value, which the user can provide to the analytics system 102 or adjust via user input. The interactive user interface generated by the analytics system 102 in block 406 also indicates a relative strength of the correlation between each pair of correlated data metrics displayed via the user interface. For example, analytics system 102 generates an interactive user interface that includes a graph showing one or more nodes that correspond to data metrics. The graph can also include an edge or line between each correlated pair of nodes, which can indicate to a user (e.g., an analyst) the correlation between the pair of nodes. In some embodiments, a size or thickness of the edge or line between each correlated pair of nodes corresponds to the strength of the correlation. As an example, a thick edge between a pair of nodes indicates a strong correlation between the pair of nodes and a thin edge between another pair of nodes indicates a weak relationship between the other pair of nodes. In some embodiments, various other characteristics of an edge between each correlated pair of nodes can indicate the strength of the correlation including, for example, a color or shade of the edge between the metrics. The interactive user interfaces can include an interactive control element (e.g., a virtual button, slider, or any other interactive element) via which a user can provide user input to adjust the threshold value, which can cause the analytics system 102 to remove, from the user interfaces, pairs of nodes having a correlation score below the threshold value and add pairs of nodes having a correlation score above the threshold value.

Figure 5A:
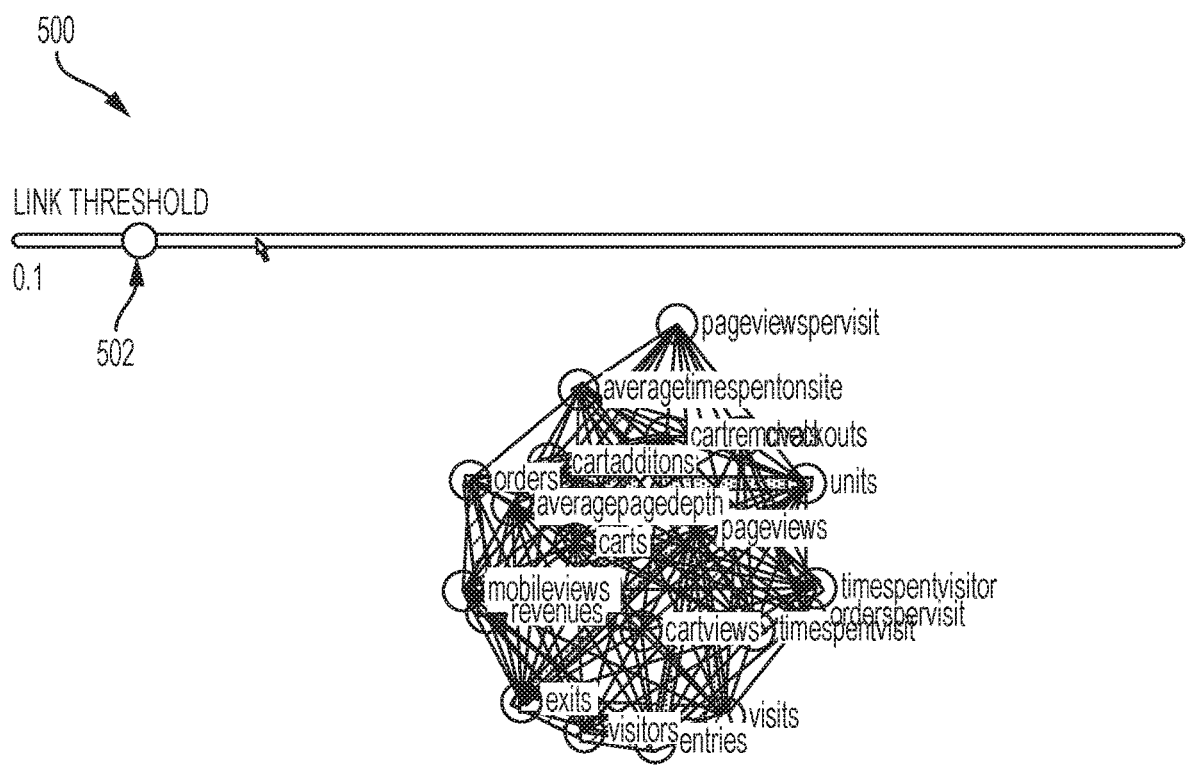
FIG. 5A is an example of an interactive user interface that can be generated for allowing analysts to understand and analyze such correlations in accordance with one or more embodiments.

FIG. 5A is an example of an interactive user interface 500 that can be generated for allowing analysts to understand and analyze such correlations in accordance with one or more embodiments. In the example depicted, the interactive user interface 500 includes a graph such as, for example, a force-directed graph (e.g., a 3D force-directed layout graph) that assigns forces among edges and nodes of the graph and can be used for visualizing data with HyperText Markup Language (HTML), Scalable Vector Graphics (SVG), or Cascading Style Sheets (CSS). In this example, the graph shows various nodes that each represent a data metric including for example, a number of webpage views per visit, an average amount of time spent on a website, a number of visits to a webpage or website, etc. In the interactive user interface 500, correlated pairs of data metrics are connected via an edge or line, which can indicate to a user a correlation between the pair of nodes representing the correlated data metrics. In some embodiments, a color, size, thickness, or other characteristic of an edge or line between a pair of nodes indicates a strength or relative strength of the correlation between the pair of nodes. For example, the color, size, or thickness of the edge between a pair of nodes can indicate the MIC score of the pair of nodes.

As an example, a thick edge between a first node and a second node indicates a strong correlation between the pair of nodes (e.g., indicates that the pair of data metrics has a high MIC score). As another example, a thin edge between a first node and a second node indicates a weak correlation between the pair of nodes (e.g., indicates that the pair of data metrics has a low MIC score). In some embodiments, various other characteristics of an edge between a pair of nodes can indicate a strength of the correlation or relationship between the pair of nodes including, for example, a color or shade of the edge between the pair of nodes. As an example, a red edge between a pair of nodes can indicate a strong correlation between the pair of nodes and a blue edge between the pair of nodes can indicate a weak correlation between the pair of nodes.

In this embodiment, the interactive user interface 500 graphically displays each pair of correlated data metrics having an MIC score greater than a threshold MIC score (e.g., 0.1). In some instances, the threshold MIC value can be a user determined or user adjustable threshold value. For example, the interactive user interface 500 includes an interactive control element 502 (e.g., a virtual button, slider, or any other interactive element) via which a user can provide user input to adjust the threshold MIC value, which can cause the analytics system 102 to remove, from the interactive user interface 500, nodes or pairs of nodes having an MIC score below the threshold MIC score and add pairs of nodes having an MIC score above the threshold MIC score.

Figure 5B:
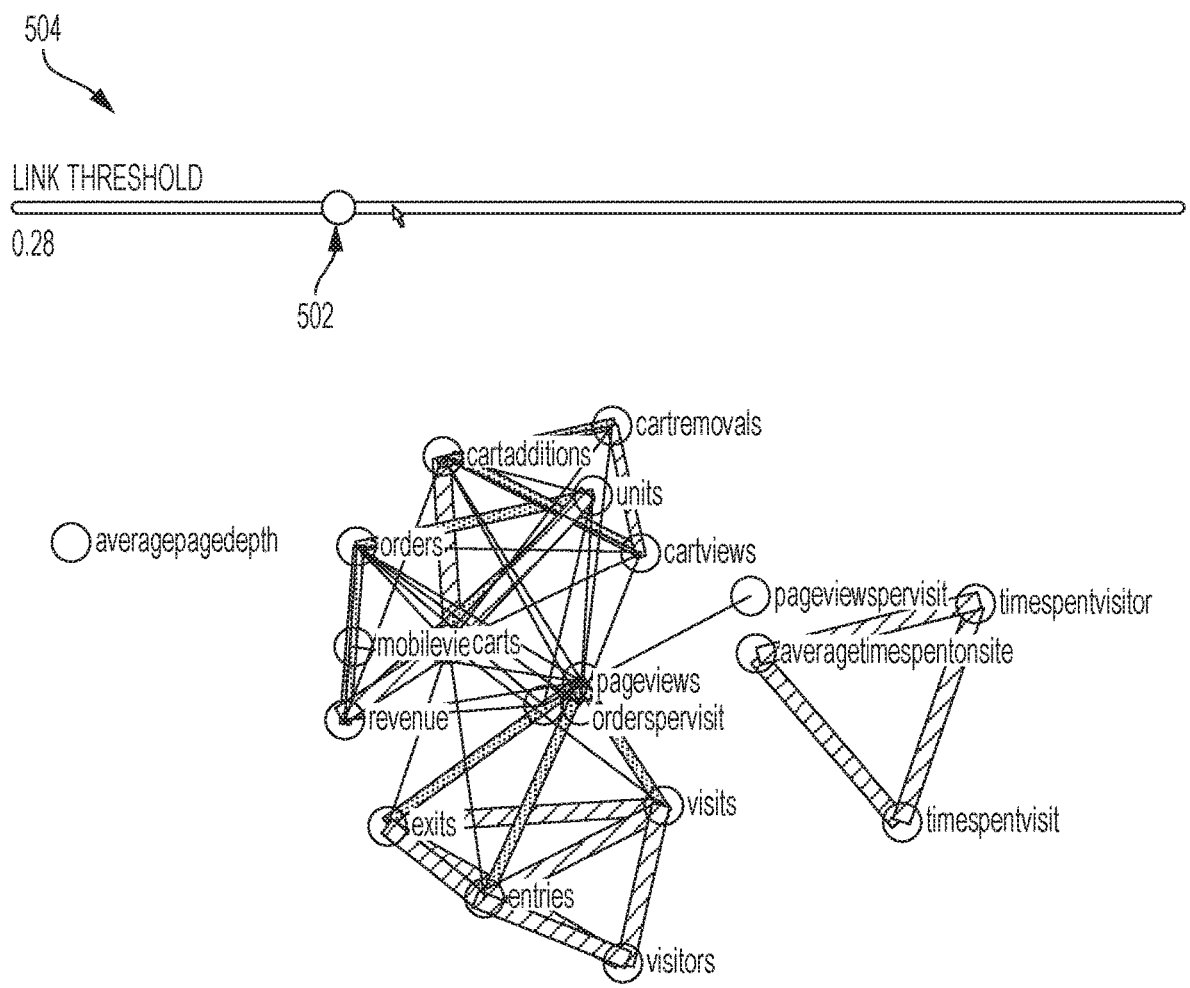
FIG. 5B is an example of another interactive user interface that can be generated for allowing analysts to understand and analyze such correlations in accordance with one or more embodiments.
Figure 5C:
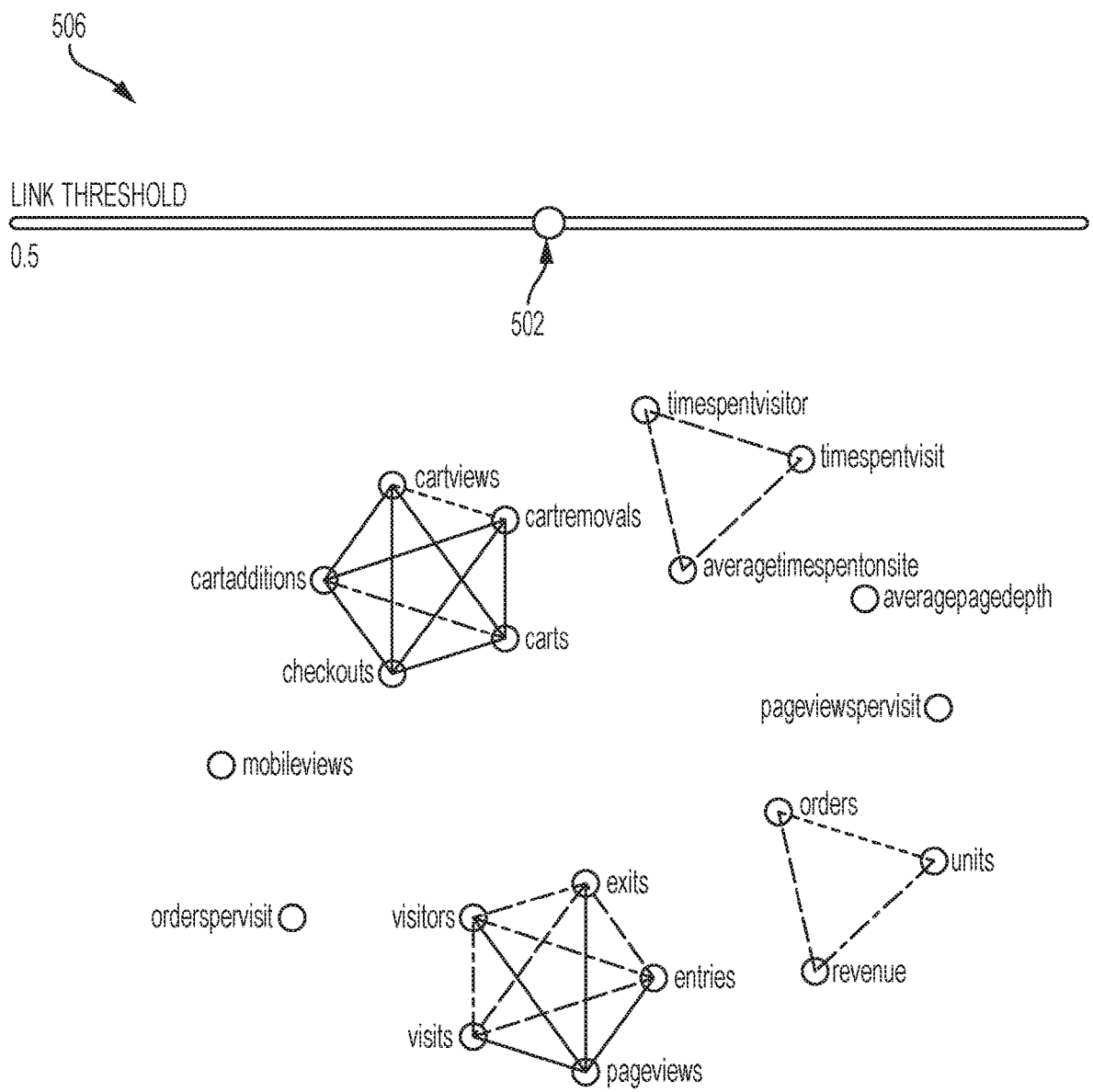
FIG. 5C is an example of another interactive user interface that can be generated for allowing analysts to understand and analyze such correlations in accordance with one or more embodiments.
Figure 5D:
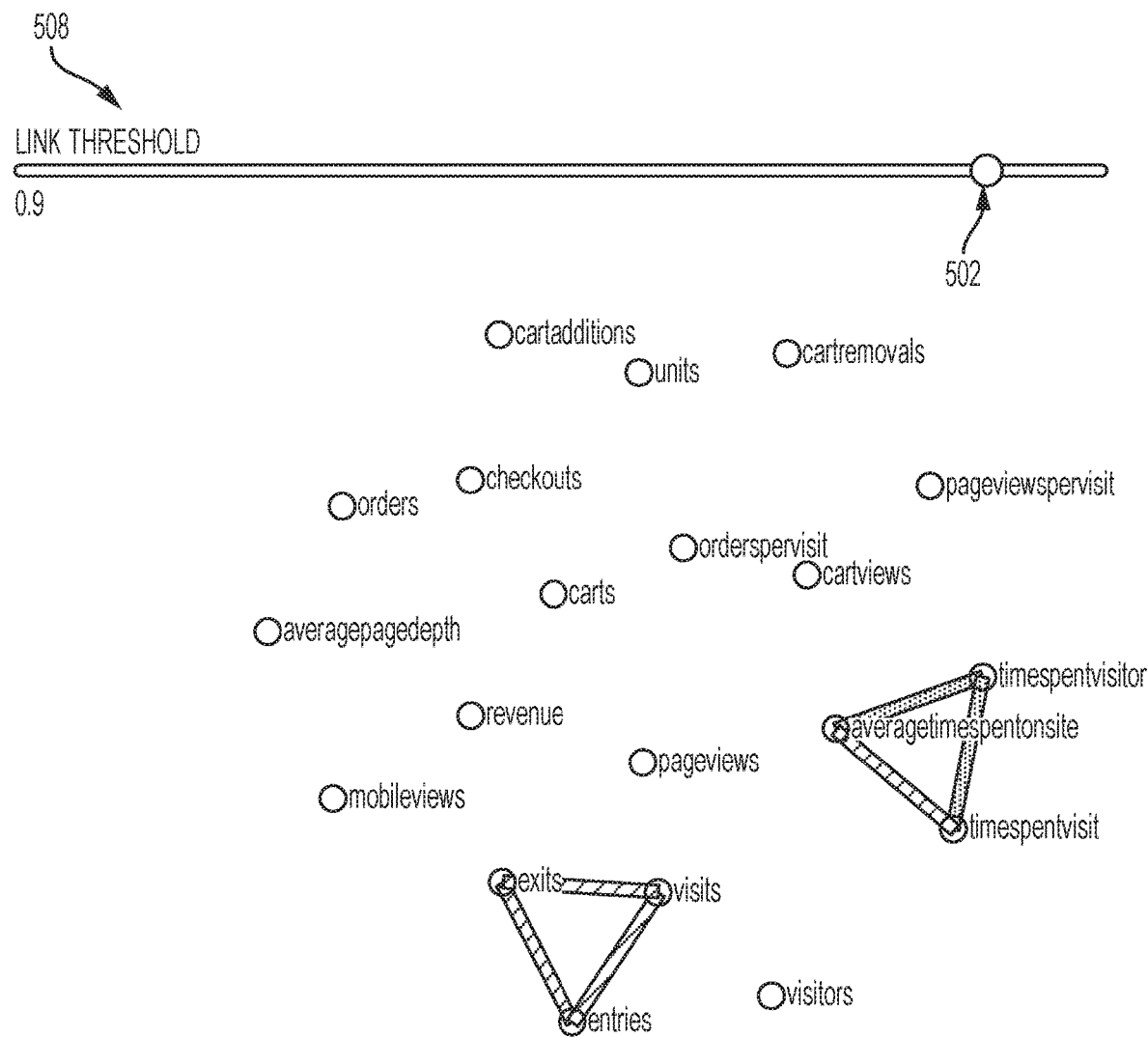
FIG. 5D is an example of another interactive user interface that can be generated for allowing analysts to understand and analyze such correlations in accordance with one or more embodiments.

As an example, FIG. 5B is an example of another interactive user interface 504 that can be generated. In the example depicted in FIG. 5B, the analytics system 102 generates the interactive user interface 504 in response to the user providing user input via the interactive control element 502 to adjust the threshold MIC score value to 0.28. In this example, the interactive user interface 504 graphically displays an edge or line only between pairs of correlated data metrics having an MIC score greater than 0.28. As another example, FIG. 5C is an example of another interactive user interface 506 that can be generated. In the example depicted in FIG. 5C, the analytics system 102 generates the interactive user interface 506 in response to the user providing user input via the interactive control element 502 to adjust the threshold MIC score value to 0.5 and the interactive user interface 506 graphically displays an edge or line only between pairs of correlated data metrics having an MIC score greater than 0.5. In still another example, FIG. 5D is an example of another interactive user interface 508 that can be generated. In the example depicted in FIG. 5D, the analytics system 102 generates the interactive user interface 508 in response to the user providing user input via the interactive control element 502 to adjust the threshold MIC score value to 0.9 and the interactive user interface 508 graphically displays an edge or line only between pairs of correlated data metrics having an MIC score greater than 0.9.

In some examples, in the embodiments depicted in FIGS. 5A-D, a user can provide user input indicating a request for additional information regarding a node or pair of nodes displayed in the interactive user interfaces 500, 504, 506, 508. For example, a user can select an edge between a pair of nodes or move a virtual button or object near the edge and the analytics system 102 can display additional information such as, for example, the MIC score of the pair of nodes. As another example, a user can select a node or move a virtual button or object near the node and the analytics system 102 displays additional information such as various other nodes or data metrics correlated with that node.

While in the examples described above with respect to FIGS. 5A-D, the interactive control element 502 is depicted as a virtual slider, button, or other interactive element, the present disclosure is not limited to such configurations. Rather, in other examples, the interactive control element can be any element via which the user can provide user input to the interactive user interfaces 500, 504, 506, 508.

Figure 6:
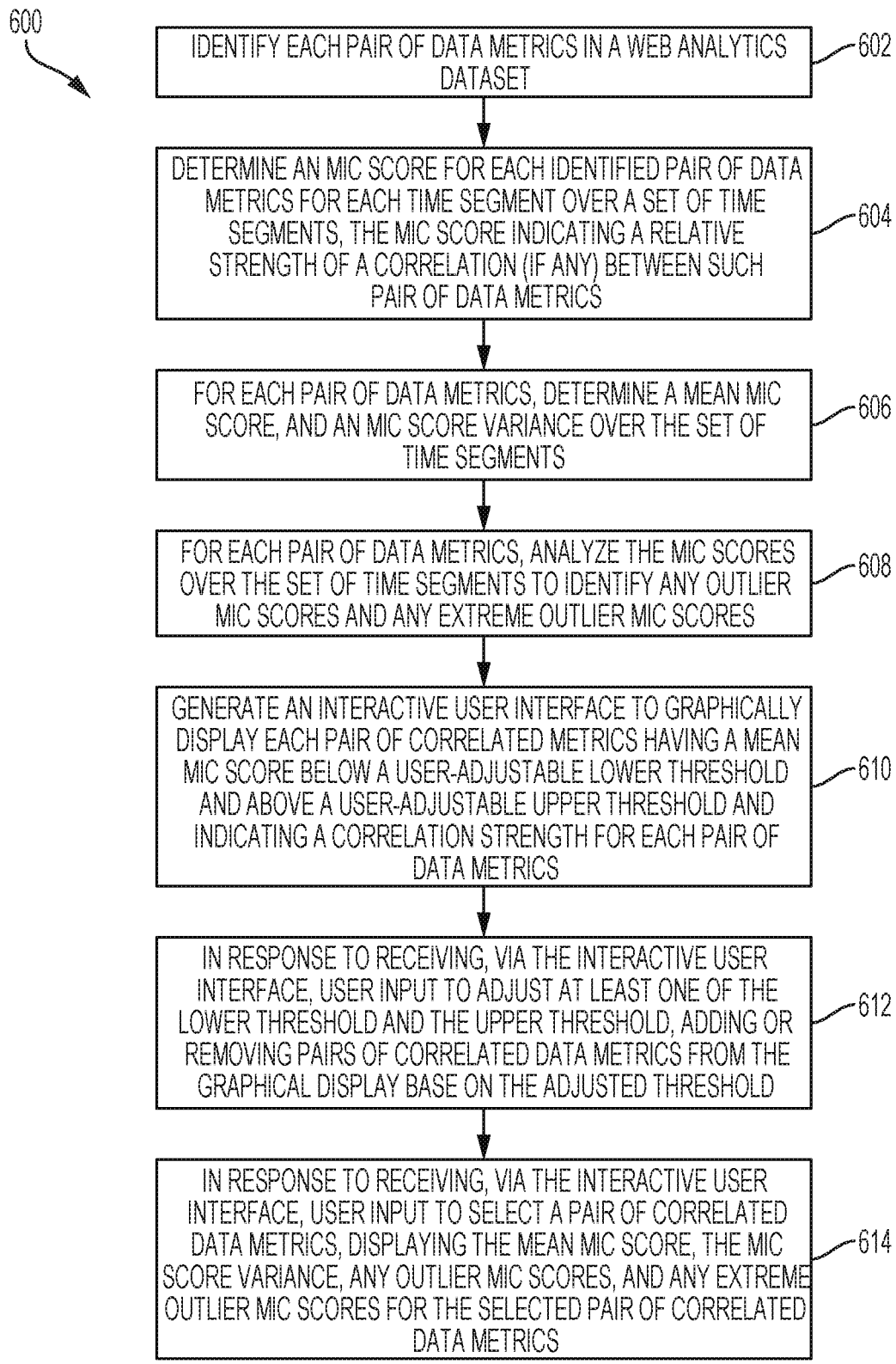
FIG. 6 is a flow chart depicting an example of a process for determining correlations between data metrics in large-scale web analytics data sets and generating user interfaces for allowing analysts to understand and analyze such correlations in accordance with one or more embodiments.

FIG. 6 is a flow chart depicting an example of a process 600 for determining correlations between data metrics in large-scale web analytics data sets and generating user interfaces for allowing analysts to understand and analyze such correlations in accordance with one or more embodiments. In some embodiments, one or more processing devices such as, for example, the computing system described herein with respect to FIG. 8, implement operations depicted in FIG. 6 by executing suitable program code (e.g., the analytics system 102 of FIG. 1) that implements one or more algorithms encompassed by the process 600. For illustrative purposes, the process 600 is described with reference to the examples depicted in FIG. 1, but other implementations are possible.

In block 602, each pair of data metrics in a web analytics dataset 114 is identified. In some examples, each pair of data metrics in the web analytics dataset 114 is identified in substantially the same manner as described above with respect to block 402 of FIG. 4.

In block 604, an MIC score for each identified pair of data metrics is determined over a set of time segments. In some examples, the MIC score for each identified pair of data metrics is determined in substantially the same manner as described above with respect to block 404 of FIG. 4. In this embodiment, the analytics system 102 determines an MIC score for each pair of data metrics for each time segment over a set of time segments. Each time segment can correspond to a day, week, month, year, or other measure of time within a set of time segments (e.g., within a time period).

In block 606, a mean or average MIC score and an MIC score variance for each pair of data metrics over the set of time segments. In some embodiments, the analytics application 106 causes the analytics system 102 to determine the mean or average MIC score and the MIC score variance for each pair of data metrics over the set of time segments.

For example, the analytics system 102 determines an MIC score for each pair of data metrics each month over a period of time of two years and determines a mean MIC score for each pair of data metrics over the two-year period. The analytics system 102 can then determine an MIC score variance for each pair of data metrics during each month over the two-year period by comparing the MIC score for each pair of data metrics during each month to the average MIC score for the pair of data metrics.

In block 608, the MIC scores for each pair of data metrics over the set of time segments are analyzed to identify one or more outlier MIC scores or one or more extreme outlier MIC scores. For example, the analytics system 102 determines an MIC score variance for each pair of data metrics during each month over a two-year period as described above. The analytics system 102 can then identify an outlier MIC score or an extreme outlier MIC score based on the MIC score variances for each pair of data metrics over the two-year period. As an example, the analytics system 102 identifies as an outlier or extreme outlier one or more MIC scores for a month during the two-year period that has an MIC variance above a variance threshold.

For instance, a pair of data metrics has a low mean MIC score over the two-year period (e.g., a mean MIC score of approximately zero over the two-year period) and has a high MIC score for a month during the two-year period (e.g., an MIC score of approximately one during that month). In this example, the analytics system 102 compares the high MIC score for that month to the low mean MIC score, determines that the MIC score variance for that month is above a variance threshold, and identifies the MIC score for that month as an outlier MIC score or an extreme outlier MIC score.

In some embodiments, the analytics system 102 applies various algorithms such as, for example, Tukey's algorithm, to the MIC scores for each pair of data metrics over the set of time segments to identify one or more outlier MIC scores or one or more extreme outlier MIC scores. In this example, the analytics system 102 applies Tukey's algorithm, which is based on Interquartile range (IQR), which is a measure of statistical dispersion. In this embodiment, the analytics system 102 uses a spread of data between upper and lower quartiles given by the following equation:

$$IQR = Q_3 - Q_1$$

In the equation above, $Q_1$ represents the lower quartile or twenty-fifth percentile and $Q_3$ represents the upper quartile or seventy-fifth percentile. The analytics system 102 can then add and subtract a multiple of IQR, depending on one or more outlier detection rules, to $Q_3$ and $Q_1$, respectively to determine outlier boundaries. In this example, the analytics system 102 can identify an MIC score for a pair of data metrics as an outlier if the MIC score is outside the range below:

$$[Q_1 - \alpha \cdot IQR, Q_3 + \alpha \cdot IQR]$$

Based on the equation above, the analytics system 102 can identify an MIC score for a pair of data metrics as an outlier MIC score (or a possible outlier MIC score) when $\alpha = 1.5$.

As another example, the analytics system 102 can identify an MIC score for a pair of data metrics as an extreme outlier MIC score (or a probable outlier MIC score) when $\alpha = 3$.

In some examples, applying Tukey's algorithm to the MIC scores for each pair of data metrics over the set of time segments to identify one or more outlier MIC scores or one or more extreme outlier MIC scores can provide various advantages. For example, some prior methods can be limited to mound-shaped and reasonably symmetric data as the normal distribution. In contrast, Tukey's algorithm is applicable to skewed or non-mound-shaped data since it makes no distributional assumptions and does not depend on a mean or standard deviation, which are sensitive to extreme values.

In other embodiments, the analytics system 102 applies various alternative or additional methods or techniques such as, for example, medcouple (MC) adjustment method, to the MIC scores for each pair of data metrics over the set of time segments to identify one or more outlier MIC scores or one or more extreme outlier MIC scores.

In block 610, an interactive user interface is generated. In some embodiments, the analytics system 102 generates the interactive user interface to graphically display each pair of correlated data metrics having a mean or average MIC score below a lower threshold value and above an upper threshold value. As an example, the analytics system 102 generates the interactive user interface to graphically display each pair of correlated data metrics having a mean or average MIC score between zero and a lower threshold MIC score and between the upper threshold value and one. In another embodiment, the analytics system 102 generates the interactive user interface to graphically display each pair of correlated data metrics having a mean or average MIC score between a lower threshold value and an upper threshold value. In some examples, the lower and upper threshold values can be lower and upper MIC threshold values that can each be a user determined or user adjustable threshold value, which the user can provide to the analytics system 102 or adjust via user input. The interactive user interface generated by the analytics system 102 in block 610 also indicates a relative strength of the correlation between each pair of correlated data metrics displayed via the user interface.

Figure 7:
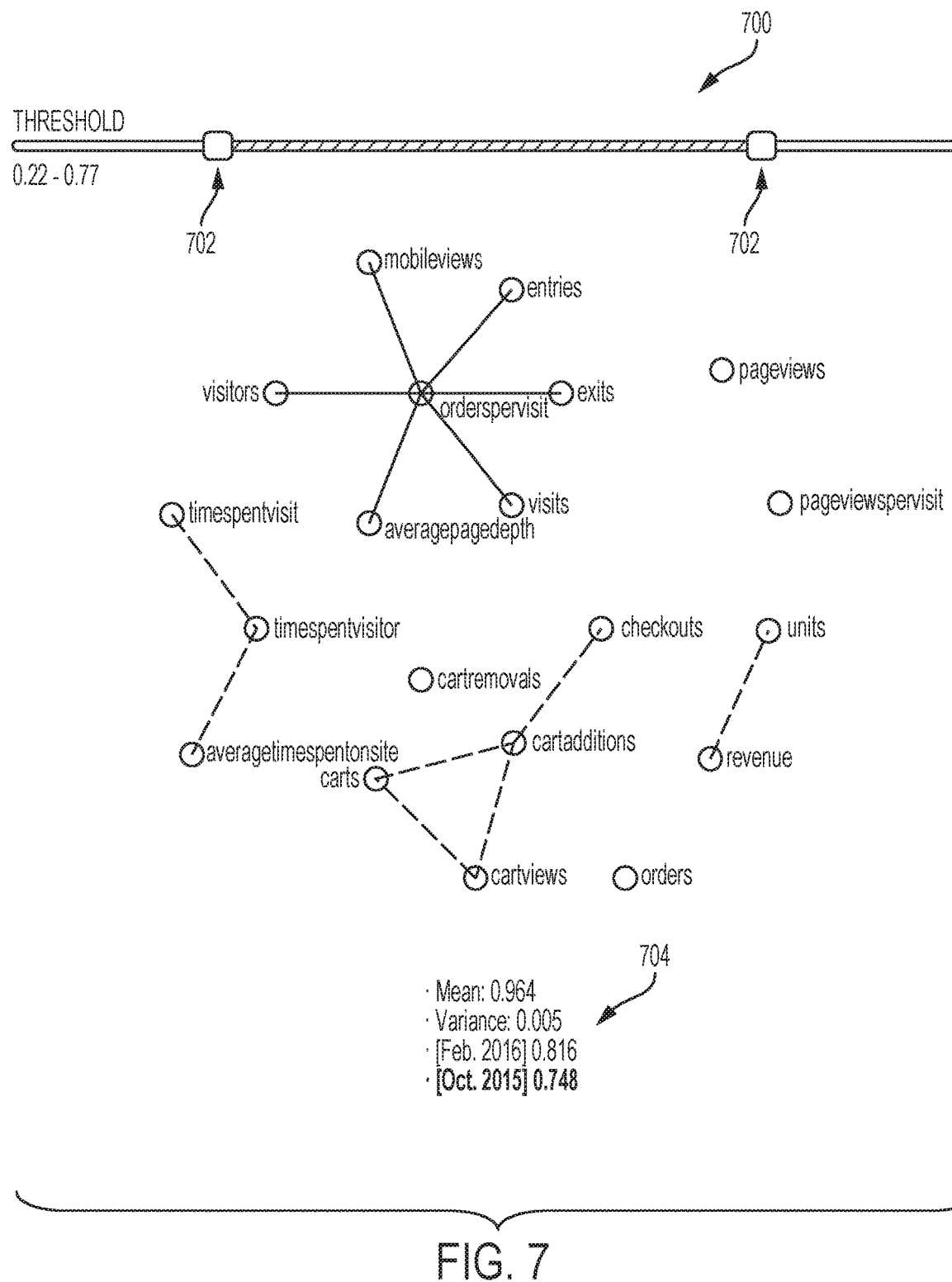
FIG. 7 is an example of an interactive user interface that can be generated for allowing analysts to understand and analyze such correlations in accordance with one or more embodiments.

For example, FIG. 7 is an example of an interactive user interface 700 that can be generated. In the example depicted, the user interface 700 includes a graph such as, for example, a force-directed graph (e.g., a 3D force-directed layout graph) that assigns forces among edges and nodes of the graph and can be used for visualizing data with HTML, SVG, or CSS. In this example, the graph shows various nodes that each represent a data metric. In the user interface 700, correlated pairs of data metrics are connected via an edge or line, which can indicate to a user a correlation between the pair of nodes representing the correlated data metrics. In some embodiments, a color, size, thickness, or other characteristic of an edge or line between a pair of nodes indicates a strength or relative strength of the correlation between the pair of nodes. For example, the color, size, or thickness of the edge between a pair of nodes can indicate the MIC score of the pair of nodes.

In this embodiment, the interactive user interface 700 graphically displays each pair of correlated data metrics having a mean MIC score between zero and a lower threshold MIC value (e.g., 0.22) and each pair of correlated data metrics having a mean MIC score between an upper threshold MIC value (e.g., 0.77) and one. The lower threshold MIC value and the upper threshold MIC value can each be a user determined or user adjustable threshold value that the user can provide or adjust by providing user input via one or more interactive control elements 702 (e.g., a virtual button, slider, or any other interactive element) in the user interface 700.

In block 612, in response to receiving, via the interactive user interface 700, user input to adjust at least one of the lower threshold and the upper threshold, pairs of correlated data metrics are added or removed from the graphical display based on the adjusted threshold.

For example, and referring back to FIG. 7, the user interface 700 includes one or more interactive control elements 702 via which a user can provide user input to provide or adjust the lower threshold MIC score or the upper threshold MIC score (e.g., by sliding or dragging one or more interactive control elements 702). In this example, in response to receiving the user input indicating the lower threshold MIC value or the upper threshold MIC value, the analytics system 102 can remove, from the user interface 700, pairs of correlated data metrics having a mean MIC score not between zero and the lower threshold MIC score (e.g., 0.22) or pairs of correlated data metrics having a mean MIC score not between the upper threshold MIC value (0.77) and one. As another example, in response to receiving user input indicating the lower and upper threshold MIC values, the analytics system 102 adds, to the user interface, pairs of correlated data metrics having a mean MIC score between zero and the lower threshold MIC value and pairs of correlated data metrics having a mean MIC score between the upper threshold MIC value and one.

Returning to FIG. 6, in block 614, in response to receiving, via the interactive user interface 700, user input to select a pair of correlated data metrics, the mean MIC score, the MIC score variance, an outlier MIC score, or an extreme outlier MIC score for the selected pair of correlated data metrics is displayed. For example, and referring to FIG. 7, the user can provide user input selecting a pair of correlated data metrics graphically displayed in user interface 700. In response to receiving the user input, the analytics system 102 generates or outputs a caption 704 that displays additional information about the selected pair of correlated data metrics. In this example, the additional information provided via the caption 704 includes the mean MIC score (e.g., 0.964), the MIC score variance (e.g., 0.005), an outlier MIC score for a time segment (e.g., an outlier MIC score of 0.816 during February 2016), and an extreme outlier MIC score for a time segment (e.g., an extreme outlier MIC score of 0.748 during October 2015) for the selected pair of correlated data metrics. In some examples, the caption 704 or additional information generated by the analytics system 102 about the selected pair of correlated data metrics can indicate whether an MIC score is an outlier or an extreme outlier. For example, a color, font, or format of a displayed MIC score can indicate whether the MIC score is an outlier or an extreme outlier. In the example depicted in FIG. 7, the extreme outlier MIC score of 0.748 during October 2015 can be displayed in bold or in a particular color or format that indicates to the user that the MIC score of 0.748 is an extreme outlier MIC score.

While in this example, the analytics system 102 displays data indicating the mean MIC score, the MIC score variance, the outlier MIC score, and the extreme outlier MIC score for the selected pair of correlated data metrics, the present disclosure is not limited to such configurations. Rather, in other examples, the analytics system 102 can display more or less data about a selected pair of correlated data metrics.

In some embodiments, the analytics system 102 can use the determined MIC scores for each pair of data metrics to determine a diversified top-k list of data metrics in the web analytics dataset 114 that is representative of the various data metrics for a particular application. An example of such application is anomaly detection, which can involve identifying a subset of data metrics causing one or more anomalies. In this example, the relevance of a set of data metrics can depend on the individual relevance of the data metrics and on how the data metrics correlate to one another.

In this example, the analytics system 102 applies one or more algorithms to outlier or extreme outlier MIC scores for pairs of data metrics to determine diversified top-k list of data metrics that contribute to the outlier or extreme outlier MIC scores or contribute to one or more anomalies in the data set. For example, the analytics system 102 determines that $s_{i,j}$ represents the MIC score between correlated data metrics i,j∈[d] where i, j represents the correlated data metrics and d represents a number of samples. The analytics system 102 also assigns a weight value w(i)∈[0,1] to each data metric i and the weight value can represent a measure of anomaly for the data metric. As an example, the more anomalous a data metric is, the higher the weight value assigned to the data metric. In this example, the analytics system 102 determines that E=[d] represents the set of data metrics in the web analytics dataset 114 and A⊆E indicates the diversified top-k list of data metrics in the web analytics dataset 114. To determine the diversified top-k set of data metrics, the web analytics applies the following equation:

$$f(A) = \Sigma_{i \in E} w(i)(1 - \Pi_{j \in A}(1 - s_{i,j}))$$

In the equation above A represents the diversified top-k set of data metrics. The analytics system 102 can then identify an optimal set of diversified top-k data metrics A* based on the following equation:

$$A^* = \underset{A \subseteq E: |A| = k}{\operatorname{argmax} f(A)}$$

In some instances, identifying or determining the optimal set of diversified top-k data metrics A* is combinatorial and is in $$O\binom{d}{k}$$

where O represents complexity, which can represent an asymptomatic behavior of a function (e.g., how fast or slow the function grows or declines) or a limiting behavior of the function and d represents a number of samples. In this example, since f is submodular and monotone in E, the analytics system 102 can use a greedy algorithm to determine an approximate solution for the optimal set of diversified top-k data metrics A*. A greedy algorithm can include, for example, an algorithm paradigm that follows the problem solving heuristic of making the locally optimal choice at each stage to determine or identify a globally-optimal solution. FIG. 8 is an example of an image of a greedy algorithm that can be used by the analytics system 102 to determine the optimal set of diversified top-k data metrics A*. The complexity O of the greedy algorithm depicted in FIG. 8 is in O(k d) and the solution obtained via the greedy algorithm is an (1−1/e)-approximation for the optimal set of diversified top-k data metrics $$A^*, \text{i.e. } f(A) \geq f(A^*) \cdot \left(1 - \frac{1}{e}\right).$$

System Implementation Example

Any suitable computing system or group of computing systems can be used for performing the operations described herein. FIG. 9 is a block diagram of an exemplary user device 104 that executes an analytics system 102 to perform the operations described herein.

The depicted example of the user device 104 includes one or more processors 902 communicatively coupled to one or more memory devices 904. The processor 902 executes computer-executable program code stored in the memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including one or more processors 902 that are configured by program code to implement the operations described above, such as the operations depicted in FIGS. 4 and 6 that are described with respect to processing devices.

The memory device 904 includes any suitable non-transitory computer-readable medium for storing the analytics system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 904 are used to implement the operations described above, such as the operations depicted in FIGS. 4 and 6 that are described with respect to one or more non-transitory computer-readable media.

The user device 104 may also include a number of external or internal devices such as input or output devices. For example, the user device 104 is shown with an input/output ("I/O") interface 908 that can receive input from input devices or provide output to output devices. A bus 906 can also be included in the user device 104. The bus 906 can communicatively couple one or more components of the user device 104. In some embodiments, the bus 906 is used to implement the operations described above with respect to FIGS. 4 and 6 that involve communicating signals via a data bus.

The user device 104 executes program code that configures the processor 902 to perform one or more of the operations described above with respect to FIGS. 1-8. The program code includes, for example, the analytics application 106 or other suitable applications that perform one or more operations described herein. The program code may be resident in the memory device 904 or any suitable computer-readable medium and may be executed by the processor 902 or any other suitable processor. In some embodiments, the program code described above is stored in the memory device 904, as depicted in FIG. 9. In additional or alternative embodiments, the program code described above is stored in one or more memory devices accessible via a data network.

The user device 104 accesses the web analytics dataset 114 in any suitable manner. In some embodiments, the web analytics dataset 114 is stored in one or more memory devices accessible via a data network 108. In additional or alternative embodiments, some or all of the web analytics dataset 114 is stored in the memory device 904.

The user device 104 depicted in FIG. 9 also includes at least one network interface 910. The network interface 910 includes any device or group of devices suitable for establishing a wired or wireless data connection to one or more data networks 108. Non-limiting examples of the network interface 910 include an Ethernet network adapter, a modem, and/or the like. In some embodiments, the network interface 910 is used to implement the operations described above with respect to FIGS. 1-8 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method for determining correlations between data metrics and generating user interfaces indicating the data metrics and correlations, the method comprising:

identifying, by a processor, a set of data metrics in a web analytics data set, the set of data metrics indicating a plurality of user behaviors with respect to one or more websites;

determining, by the processor, a respective pairwise score for each pair of data metrics in the set of data metrics, the respective pairwise score for each pair of data metrics indicating a strength of a correlation between the pair of data metrics;

generating, by the processor, an interactive user interface graphically displaying a set of nodes, each node representing a corresponding data metric indicating a corresponding user behavior with respect to the one or more websites, and each pair of correlated data metrics represented by a corresponding pair of nodes in the interactive user interface having a respective pairwise score above a threshold;

receiving, by the processor, user input indicating an adjustment to the threshold;

modifying, by the processor, the interactive user interface in response to receiving the user input by adding to the interactive user interface pairs of nodes representing pairs of correlated data metrics having respective pairwise scores above the threshold as adjusted or removing from the interactive user interface pairs of nodes representing pairs of correlated data metrics having respective pairwise scores not above the threshold as adjusted, based on the adjustment to the threshold;
assigning anomaly values to the set of data metrics, the anomaly values comprising a respective anomaly value for each data metric in the set of data metrics based on outlier values of the data metric;
determining a diversified top-k list of data metrics to represent the set of data metrics, wherein determining the diversified top-k list comprises:
grouping the data metrics into a first set of data metrics and a second set of data metrics;
evaluating a function as applied to the first set of data metrics based on the respective anomaly values of the first set of data metrics and the respective pairwise score of each data metric in the first set with each other data metric in the first set;
evaluating the function as applied to the second set of data metrics based on the respective anomaly values of the second set of data metrics and the respective pairwise score of each data metric in the second set with each other data metric in the second set; and
selecting the first set of data metrics as the diversified top-k list based on the first set of data metrics optimizing the function as compared to the second set of data metrics; and
outputting, via the interactive user interface, a graphical display of a selection of the nodes representing the diversified top-k list of the data metrics.

2. The method of claim 1, wherein generating the interactive user interface comprises generating, by the processor, a graph that includes a plurality of nodes and a plurality of edges, wherein an edge of the plurality of edges connects a pair of nodes representing a pair of correlated data metrics and indicates the correlation between the pair of correlated data metrics.

3. The method of claim 2, wherein a characteristic of the edge connecting the pair of correlated data metrics indicates the strength of the correlation between the pair of correlated data metrics, the characteristic including a size, thickness, or color of the edge connecting the pair of correlated data metrics.

4. The method of claim 2, wherein the graph is a three-dimensional force-directed graph.

5. The method of claim 1, wherein the interactive user interface includes an interactive control element via which the user can provide the user input indicating the threshold or the adjustment to the threshold.

6. The method of claim 5, wherein the interactive control element comprises a virtual button or a virtual slider via which the user can provide the user input indicating the threshold or the adjustment to the threshold.

7. The method of claim 1, wherein maximizing the function of the anomaly values to identify the diversified top-k list of data metrics further comprising maximizing the function of the anomaly values and of the respective pairwise score for each pair of data metrics in the set of data metrics.

8. The method of claim 1, wherein each respective anomaly value in the anomaly values is a weight describing a degree of anomaly across time segments for the corresponding data metric.

9. The method of claim 1, wherein the respective pairwise score for each pair of data metrics in the set of data metrics is a respective Maximal Information Coefficient (MIC) score.

10. A method for determining correlations between data metrics and generating user interfaces, the method comprising:
identifying, by a processor, a set of data metrics in a web analytics data set, the set of data metrics indicating a plurality of user behaviors with respect to one or more websites;
determining, by the processor, a respective pairwise score for each pair of data metrics in the set of data metrics for each time segment over a set of time segments, the respective pairwise score for each pair of data metrics indicating a strength of a correlation between the pair of data metrics;
determining, by the processor and for each pair of data metrics, a respective mean pairwise score over the set of time segments;
generating, by the processor, an interactive user interface graphically displaying a set of nodes, each node representing a corresponding data metric indicating a corresponding user behavior with respect to the one or more websites, and each pair of correlated data metrics represented by a corresponding pair of nodes in the interactive user interface having a respective mean pairwise score below a lower threshold or above an upper threshold;
assigning anomaly values to the set of data metrics, the anomaly values comprising a respective anomaly value for each data metric in the set of data metrics based on outlier values of the data metric;
determining a diversified top-k list of data metrics to represent the set of data metrics, wherein determining the diversified top-k list comprises:
grouping the data metrics into a first set of data metrics and a second set of data metrics;
evaluating a function as applied to the first set of data metrics based on the respective anomaly values of the first set of data metrics and the respective mean pairwise score of each data metric in the first set with each other data metric in the first set;
evaluating the function as applied to the second set of data metrics based on the respective anomaly values of the second set of data metrics and the respective mean pairwise score of each data metric in the second set with each other data metric in the second set; and
selecting the first set of data metrics as the diversified top-k list based on the first set of data metrics optimizing the function as compared to the second set of data metrics; and
outputting, via the interactive user interface, a graphical display of a selection of the nodes representing the diversified top-k list of the data metrics.

11. The method of claim 10, further comprising:
receiving, by the processor, user input indicating a selection of a pair of correlated data metrics displayed via the interactive user interface;
determining, by the processor, for the selected pair of correlated data metrics, a score variance, an outlier score, or an extreme outlier score over the set of time segments; and
displaying, by the processor, at least one of the respective mean pairwise score, the score variance, the outlier score, or the extreme outlier score for the selected pair of correlated data metrics via the interactive user interface.

12. The method of claim 10, wherein generating the interactive user interface comprises generating, by the processor, a graph that includes a plurality of nodes and a plurality of edges, wherein an edge of the plurality of edges connects a pair of nodes representing a pair of correlated data metrics and indicates the correlation between the pair of correlated data metrics.

13. The method of claim 12, wherein a characteristic of the edge connecting the pair of correlated data metrics indicates the strength of the correlation between the pair of correlated data metrics, the characteristic including a size, thickness, or color of the edge connecting the pair of correlated data metrics.

14. The method of claim 12, wherein the graph is a three-dimensional force-directed graph.

15. The method of claim 10, wherein the interactive user interface includes an interactive control element via which the user can provide the user input indicating the lower threshold or upper threshold or an adjustment to the lower threshold or upper threshold.

16. A system comprising:
 a means for identifying a set of data metrics in a web analytics data set, the set of data metrics indicating a plurality of user behaviors with respect to one or more websites, and each data metric in the set of data metrics indicating a corresponding user behavior with respect to the one or more websites;
 a means for determining a respective pairwise score for each pair of data metrics in the set of data metrics, the respective pairwise score for each pair of data metrics indicating a strength of a correlation between the pair of data metrics;
 a means for generating an interactive user interface graphically displaying a set of nodes, each node representing a corresponding data metric indicating a corresponding user behavior with respect to the one or more websites, and each pair of correlated data metrics represented by a corresponding pair of nodes in the interactive user interface having a respective pairwise score above a threshold;
 a means for assigning anomaly values to the set of data metrics, the anomaly values comprising a respective anomaly value for each data metric in the set of data metrics based on outlier values of the data metric;
 a means for determining a diversified top-k list of data metrics to represent the set of data metrics, wherein determining the diversified top-k list comprises:
  grouping the data metrics into a first set of data metrics and a second set of data metrics;
  evaluating a function as applied to the first set of data metrics based on the respective anomaly values of the first set of data metrics and the respective pairwise score of each data metric in the first set with each other data metric in the first set;
  evaluating the function as applied to the second set of data metrics based on the respective anomaly values of the second set of data metrics and the respective pairwise score of each data metric in the second set with each other data metric in the second set; and
  selecting the first set of data metrics as the diversified top-k list based on the first set of data metrics optimizing the function as compared to the second set of data metrics; and
 outputting, via the interactive user interface, a graphical display of a selection of the nodes representing the diversified top-k list of the data metrics.

17. The system of claim 16, wherein generating the interactive user interface comprises generating a graph that includes a plurality of nodes and a plurality of edges, wherein an edge of the plurality of edges connects a pair of nodes representing a pair of correlated data metrics and indicates the correlation between the pair of correlated data metrics.

18. The system of claim 17, wherein a characteristic of the edge connecting the pair of correlated data metrics indicates the strength of the correlation between the pair of correlated data metrics, the characteristic including a size, thickness, or color of the edge connecting the pair of correlated data metrics.

19. The system of claim 17, wherein the graph is a three-dimensional force-directed graph.

20. The system of claim 16, wherein the interactive user interface includes an interactive control element via which the user can provide the user input indicating the threshold or an adjustment to an threshold and wherein the interactive control element comprises a virtual button or a virtual slider.

* * * * *